(12) United States Patent
Kobayashi (10) Patent No.: US 7,836,268 B2
(45) Date of Patent: Nov. 16, 2010

(54) METHOD, APPARATUS, AND SYSTEM FOR CONTROLLING DATA STORAGE

(75) Inventor: Tooru Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 460 days.

(21) Appl. No.: 11/896,264

(22) Filed: Aug. 30, 2007

(65) Prior Publication Data

US 2008/0114932 A1    May 15, 2008

(30) Foreign Application Priority Data

Nov. 15, 2006    (JP)    ............................. 2006-309425

(51) Int. Cl.
*G06F 12/00*    (2006.01)
(52) U.S. Cl. ........................... 711/162; 711/161; 714/6; 707/640
(58) Field of Classification Search ......... 711/161–162; 707/640–641, 645–647; 714/6
See application file for complete search history.

(56) References Cited

U.S. PATENT DOCUMENTS

| | | | | |
|---|---|---|---|---|
| 7,069,379 B2 * | 6/2006 | Inagaki | ........................ | 711/112 |
| 7,343,459 B2 * | 3/2008 | Prahlad et al. | .............. | 711/162 |
| 2006/0253731 A1 * | 11/2006 | Petruzzo | ........................ | 714/6 |

FOREIGN PATENT DOCUMENTS

| | | |
|---|---|---|
| JP | 07-306757 | 11/1995 |
| JP | 2003-058326 | 2/2003 |

* cited by examiner

*Primary Examiner*—Jasmine Song
(74) *Attorney, Agent, or Firm*—Staas & Halsey LLP (57) ABSTRACT

When taking a back up of data stored on a disk in a redundant array of inexpensive disks (RAID) device to a plurality of tape devices, writing of the data is first started on all the tape devices. Once writing of the data is completed on the tape device having the highest data writing speed, writing of the data on other tape devices is stopped, and the data is set as clearing target data to be cleared from the disk of the RAID device. The data stored on the tape device, which has the highest data writing speed, is backed up to the other tape devices at a later timing.

10 Claims, 9 Drawing Sheets

| LOGICAL VOLUME | TAPE DEVICE 0 | TAPE DEVICE 1 | TAPE DEVICE 2 |
|---|---|---|---|
| LV0 | SUCCESSFUL | SUCCESSFUL | |
| LV1 | SUCCESSFUL | SUCCESSFUL | SUCCESSFUL |
| ⋮ | ⋮ | ⋮ | ⋮ |
| LV100 | SUCCESSFUL | | SUCCESSFUL |
| ⋮ | ⋮ | ⋮ | ⋮ |
| LVx | | | |

FIG.5

| LOGICAL VOLUME | TAPE DEVICE 0 | | | |
| --- | --- | --- | --- | --- |
| | ACCUMULATED TIME (S) | NUMBER OF WRITINGS (TIMES) | AVERAGE WRITING TIME (S) | EQUIVALENCE |
| LV0 | 234532 | 3608 | 65 | SUCCESSFUL |
| LV1 | 309999 | 30999 | 10 | SUCCESSFUL |
| ... | ... | ... | ... | ... |
| LV100 | 12345 | 308 | 40 | FAILED |
| ... | ... | ... | ... | ... |
| LVx | | | | |

| LOGICAL VOLUME | TAPE DEVICE 1 | | | |
| --- | --- | --- | --- | --- |
| | ACCUMULATED TIME (S) | NUMBER OF WRITINGS (TIMES) | AVERAGE WRITING TIME (S) | EQUIVALENCE |
| LV0 | 703696 | 3608 | 195 | SUCCESSFUL |
| LV1 | 309999 | 3099 | 100 | SUCCESSFUL |
| ... | ... | ... | ... | ... |
| LV100 | | | | |
| ... | ... | ... | ... | ... |
| LVx | | | | |

| LOGICAL VOLUME | TAPE DEVICE 2 | | | |
| --- | --- | --- | --- | --- |
| | ACCUMULATED TIME (S) | NUMBER OF WRITINGS (TIMES) | AVERAGE WRITING TIME (S) | EQUIVALENCE |
| LV0 | | | | |
| LV1 | 929997 | 30999 | 30 | SUCCESSFUL |
| ... | ... | ... | ... | ... |
| LV100 | 30862.5 | 308 | 100 | SUCCESSFUL |
| ... | ... | ... | ... | ... |
| LVx | | | | |

FIG.6

| LOGICAL VOLUME | EQUIVALENCE | DUPLICATION STOP TIME | DUPLICATION START TIME |
|---|---|---|---|
| LV0 | SUCCESSFUL | | |
| LV1 | COPYING | JULY 01, 2006, 11:00 AM | JULY 02, 2006, 3:00 PM |
| ⋮ | ⋮ | ⋮ | ⋮ |
| LV100 | FAILED | JULY 11, 2006, 5:50 AM | |

METHOD, APPARATUS, AND SYSTEM FOR CONTROLLING DATA STORAGE

BACKGROUND OF THE INVENTION

1. Field of the Invention

The present invention relates to a method, an apparatus, and a system for controlling data storage, and more particularly, to an apparatus for data storage control that duplicates data stored in a first storage device on a second storage device and a third storage device thereby preventing performance degradation that is caused by a shortage of a disk space of the first storage device used as a cache.

2. Description of the Related Art

A virtual tape system makes it possible to save data as if it were being stored on a physical tape device although it is actually stored on a disk device included in the virtual tape system (see, for example, Japanese Patent Application Laid-Open No. 2003-58326). In the virtual tape system, the disk device is used as a cache for high-speed data writing/reading.

The virtual tape system is generally connected to a tape library including a tape device at the back end of the system. Upon receiving data from a host device, the virtual tape system stores the data on the disk device as backup target data. Then, the virtual tape system backs up the data to a tape medium in the tape device at a predetermined timing. The backup target data is stored on the disk device until the data is completely backed up to the tape medium.

When the backup target data is highly significant, the data is usually backed up to a plurality of tape media. This method of backed up is referred to as "data duplication". In the conventional technique, the backup target data is transmitted to all the tape media simultaneously in parallel.

Moreover, in case of emergency such as the occurrence of a natural disaster, the data is usually backed up not only onto the tape media but also to a tape medium present in a remote tape device and connected via a network. Namely, the backup target data is duplicated on the local tape devices as well as on the remote tape device.

Thus, it is necessary to duplicate data in case the data is lost due to a damage of the tape media or the occurrence of a natural disaster.

In the conventional technique, however, a time lag can occur among the tape devices at the time of data duplication. Namely, some of the tape devices may have different data writing times than others. The data writing times can differ, for example, due to a difference in level of performances (such as a data writing speed or a data transfer speed via an interface) or occurrence of hardware failures. Furthermore, in the remote tape devices, the data writing speed can particularly vary depending on a line speed of the network.

If a time lag occurs among the tape devices at the time of data duplication, some of the tape devices lag behind in backup of the data. The backup target data is held on the disk device until the backup target data is completely backed up to all the tape devices. Therefore, if massive amount of data is transmitted from the host device in clusters, the disk space of the disk device can run out. When the disk space of a disk device runs out, that disk device enters into a standby state; because, an area enough for data storage can not be secured in that disk device.

If disk devices frequently enter into a standby state, an overall speed of both the data writing and the data reading decreases. As a result, the virtual tape system fails to perform high-speed data writing or reading. Thus, there has been a need of a technology that can prevent performance degradation of a disk device caused by a shortage of the disk space.

SUMMARY OF THE INVENTION

It is an object of the present invention to at least partially solve the problems in the conventional technology.

According to an aspect of the present invention, an apparatus for duplicating data stored in a first storage device on a second storage device and a third storage device includes a data storing unit that stores the data stored in the first storage device on the second storage device; a data setting unit that sets, upon the data storing unit completes storing of the data in the second storage device, the data stored in the first storage device as clearing target data to be cleared from the first storage device; and a data backup unit that backs up the data stored in the second storage device to the third storage device upon the data setting unit setting completes setting of the clearing target data.

According to another aspect of the present invention, a method for duplicating data stored in a first storage device on a second storage device and a third storage device includes storing the data stored in the first storage device on the second storage device; setting, upon completion of the storing, the data stored in the first storage device as clearing target data to be cleared from the first storage device; and backing up the data stored in the second storage device to the third storage device upon completion of the setting.

According to still another aspect of the present invention, a system for controlling data comprising a first storage device and an apparatus for duplicating data stored in a first storage device on a second storage device and a third storage device. The system includes a data storing unit that stores the data stored in the first storage device on the second storage device; a data setting unit that sets, upon the data storing unit completes storing of the data in the second storage device, the data stored in the first storage device as clearing target data to be cleared from the first storage device; and a data backup unit that backs up the data stored in the second storage device to the third storage device upon the data setting unit setting completes setting of the clearing target data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are explained in detail below with reference to the accompanying drawings. In the embodiments, the present invention is applied to a virtual tape system.

Figure 1A:
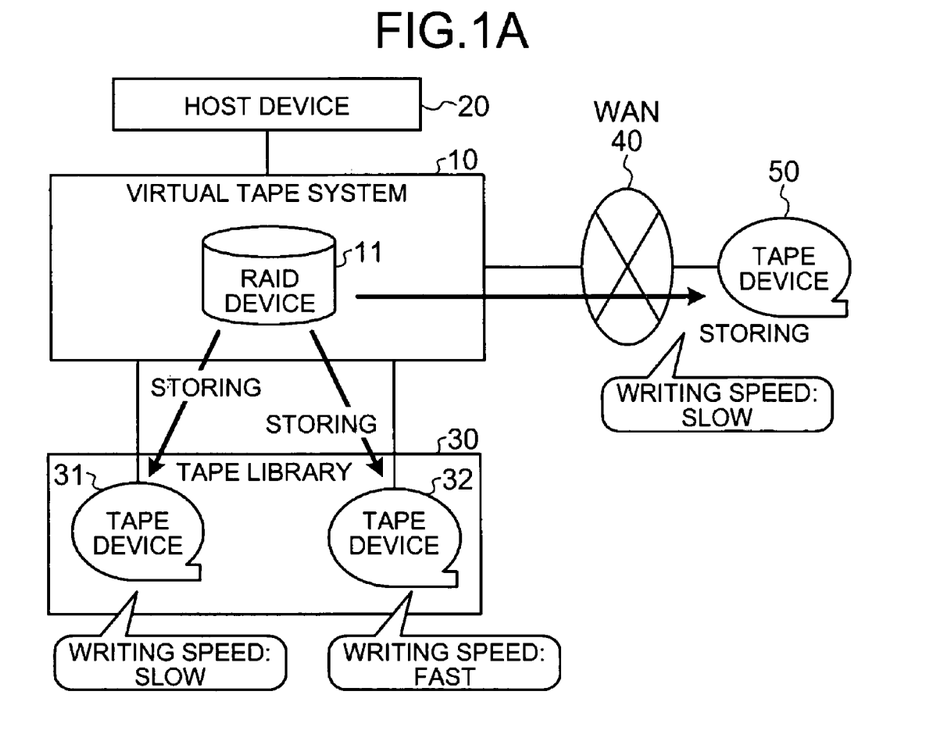
FIG. 1A is a schematic for explaining an operation of a virtual tape system according to an embodiment of the present invention when a redundant array of inexpensive disks (RAID) device has enough disk space.
Figure 1B:
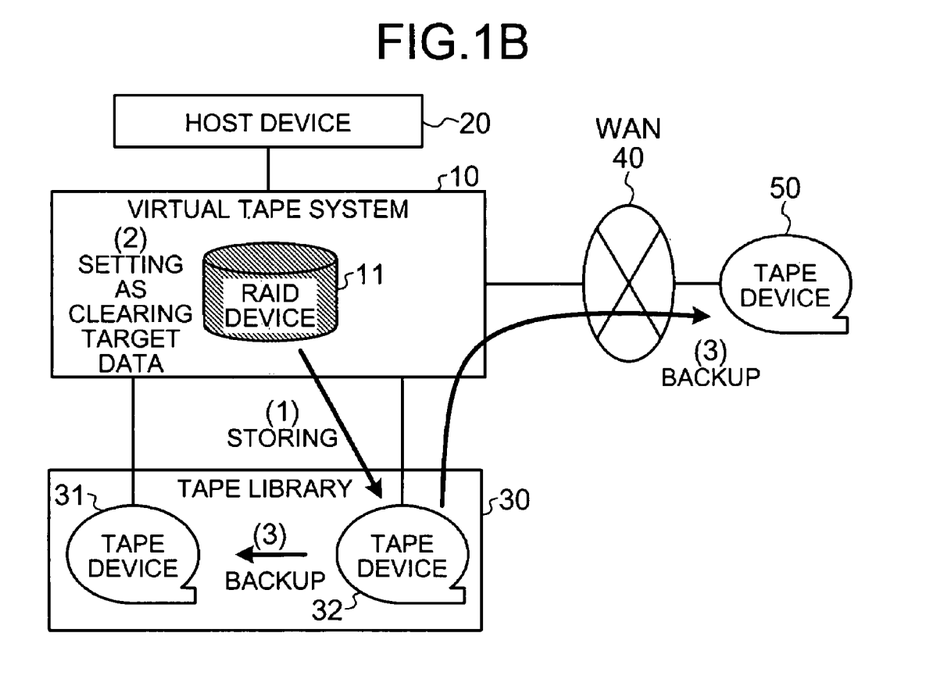
FIG. 1B is a schematic for explaining an operation of the virtual tape system shown in FIG. 1A when a disk space of the RAID device drops below a threshold.

FIGS. 1A and 1B are schematics of a virtual tape system 10 according to an embodiment of the present invention. The virtual tape system 10 includes a redundant array of inexpensive disks (RAID) device 11. The virtual tape system 10 is connected to a host device 20, tape devices 31 and 32 in a tape library 30, and a tape device 50. The virtual tape system 10 is connected to the host device 20 and the tape devices 31 and 32 via a network, and connected to the tape device 50 via a wide area network (WAN) 40.

Upon receiving data from the host device 20, the virtual tape system 10 stores the data on a disk in the RAID device 11. Then, the virtual tape system 10 duplicates the data on the tape devices 31, 32, and 50. Once duplication of data on all the tape devices 31, 32, and 50 has completed, the virtual tape system 10 sets the corresponding data stored on the disk of the RAID device 11 as clearing target data, i.e., data to be cleared from the disk. When storing new data, the virtual tape system 10 clears the clearing target data from the disk of the RAID device 11 to make a space for storing the new data therein.

If the RAID device 11 has enough disk space, the virtual tape system 10 stores data on all the tape devices 31, 32, and 50 (see FIG. 1A) without differentiating between the tape devices. However, if the disk space of the disk of the RAID device 11 drops below a threshold due to an increase of an amount of data, the virtual tape system 10 selects one of the tape devices 31, 32, and 50 that has the highest data writing speed and stores data on the selected tape device, in this case, the tape device 32 (see FIG. 1B, (1)).

It is assumed that the tape device 32 has the highest data writing speed. In this case, the virtual tape system 10 selects the tape device 32, and stores data on the tape device 32. Once storing of the data on the tape device 32 is completed, the virtual tape system 10 sets the data stored on the disk of the RAID device 11 as clearing target data (see FIG. 1B, (2)).

The virtual tape system 10 backs up the data stored on the tape devices 32 to the tape devices 31 and 50 at a predetermined timing, for example, during off-peak hours of workloads (see FIG. 1B, (3)).

As described above, when data stored in the RIAD device 11 is backed up to a plurality of tape devices, the virtual tape system 10 selects one of the tape devices that has the highest data writing speed and stores the data on the selected tape device. Once the data is completely stored on the selected tape device, the virtual tape system 10 sets the data stored on the disk as the clearing target data. Afterwards, the virtual tape system 10 backs up the data stored on the selected tape device to the other tape devices at the predetermined timing.

Thus, it becomes possible to prevent the performance degradation caused by a shortage of a disk space of the disk used as a cache.

The number of the tape devices in the tape library 30, or the number of the tape devices connected to the virtual tape system 10 via the WAN 40, are not limited to those shown in FIG. 1A or 1B. In other words, the tape library 30 can include more than two tape devices. Similarly, more than one tape device can be connected to the virtual tape system 10 via the WAN 40. Moreover, the network is not limited to WAN. In other words, the network can be a local area network (LAN) or the Internet.

Figure 2:
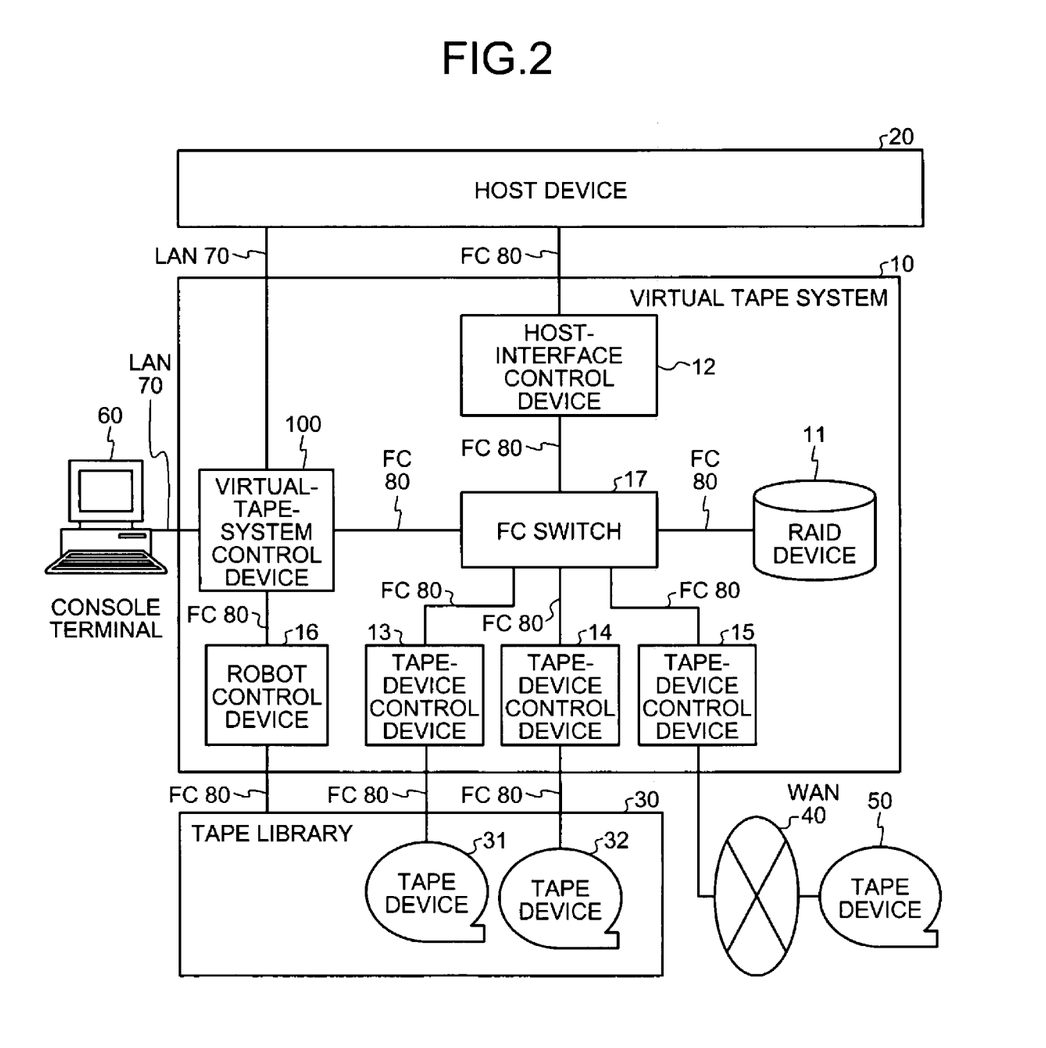
FIG. 2 is a detailed block diagram of the virtual tape system shown in FIG. 1A.

FIG. 2 is a detailed block diagram of the virtual tape system 10. The virtual tape system 10 is connected to the host device 20 via a LAN 70 and a fiber channel (FC) 80, and connected to the tape library 30 and the tape devices 31 and 32 via the FC 80, and connected to the tape device 50 via the WAN 40, and further connected to a console terminal 60 via the LAN 70.

The virtual tape system 10 includes the RAID device 11, a host-interface control device 12, tape-device control devices 13, 14, and 15, a robot control device 16, an FC switch 17, and a virtual-tape-system control device 100 those are connected by the FC 80.

The RAID device 11 is a storage unit that includes a plurality of disks as storage media. Upon receiving data from the host device 20, the RAID device 11 stores the data on a logical volume that is defined by one or a plurality of the disks based on an instruction from the virtual-tape-system control device 100.

The host-interface control device 12 performs controlling a host interface, an emulation of a group of virtual tape devices, data compression, and the like. For example, the host-interface control device 12 converts an instruction for tape devices from the host device 20 to an instruction for the virtual tape system.

The tape-device control devices 13, 14, and 15 write data stored on the disks in the RAID device 11 to the tape devices 31, 32, and 50 respectively based on an instruction from the virtual-tape-system control device 100. To the contrary, the tape-device control devices 13, 14, and 15 retrieve the data from the tape devices 31, 32, and 50 respectively, and transmit the retrieved data to the host-interface control device 12 based on an instruction from the virtual-tape-system control device 100.

The robot control device 16 controls causing a robot arm (not shown) included in the tape library 30 to load tape media with a plurality of tape devices included in the tape library 30 or to eject tape media from the tape devices based on an instruction from the virtual-tape-system control device 100.

The FC switch 17 is a switch to relay data or a control signal, which is exchanged among the devices in the virtual tape system 10, under the control of the virtual-tape-system control device 100. For example, the FC switch 17 relays data received from the host device 20 via the host-interface control device 12 to the RAID device 11, or relays data stored on a disk in the RAID device 11 to the tape device 31, 32, or 50 via the tape-device control device 13, 14, or 15.

The virtual-tape-system control device 100 controls the entire virtual tape system 10. For example, based on an instruction from the host device 20, the virtual-tape-system control device 100 transmits data received from the host device 20 to the RAID device 11 via the FC switch 17, or transmits data stored on a disk in the RAID device 11 to the tape devices 31, 32, and 50, or instructs the robot control device 16 to control the tape library 30.

The host device 20 processes information from, for example, a mainframe or a server. The host device 20 transmits data to the virtual tape system 10, or receives data from the virtual tape system 10.

The tape library 30 is a storage unit that includes a plurality of tape devices including the tape devices 31 and 32 and the robot arm that is used to load tape media with the tape devices. Under the control of the virtual tape system 10, the tape library 30 stores data transmitted from the virtual tape system 10 on a tape medium included in the tape device at a predetermined timing.

The console terminal 60 is a terminal that includes an input unit (not shown) such as a mouse or a keyboard and a display unit (not shown). The virtual tape system 10 receives a user's request via the console terminal 60.

Figure 3:
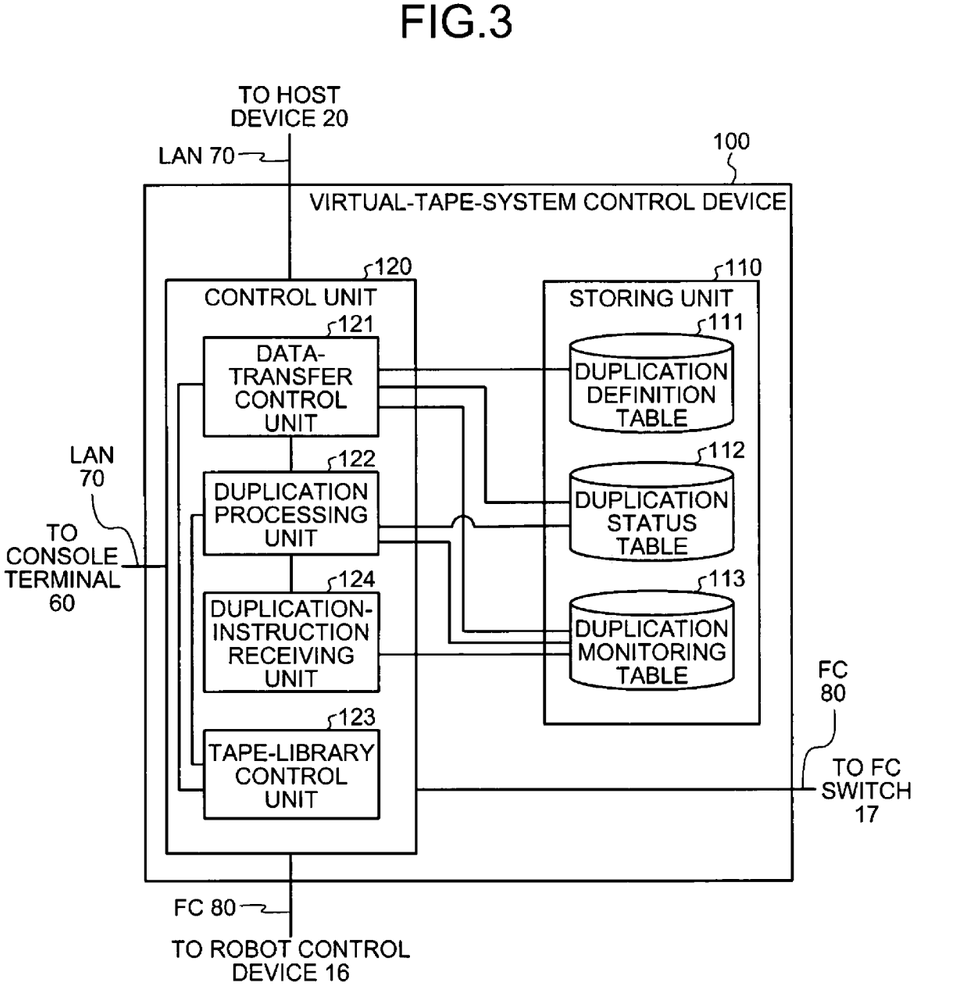
FIG. 3 is a detailed block diagram of a virtual-tape-system control device shown in FIG. 2.

FIG. 3 is a block diagram of the virtual-tape-system control device 100. The virtual-tape-system control device 100 includes a storing unit 110 and a control unit 120.

The storing unit 110 stores therein a duplication definition table 111, a duplication status table 112, and a duplication monitoring table 113.

Figure 4:
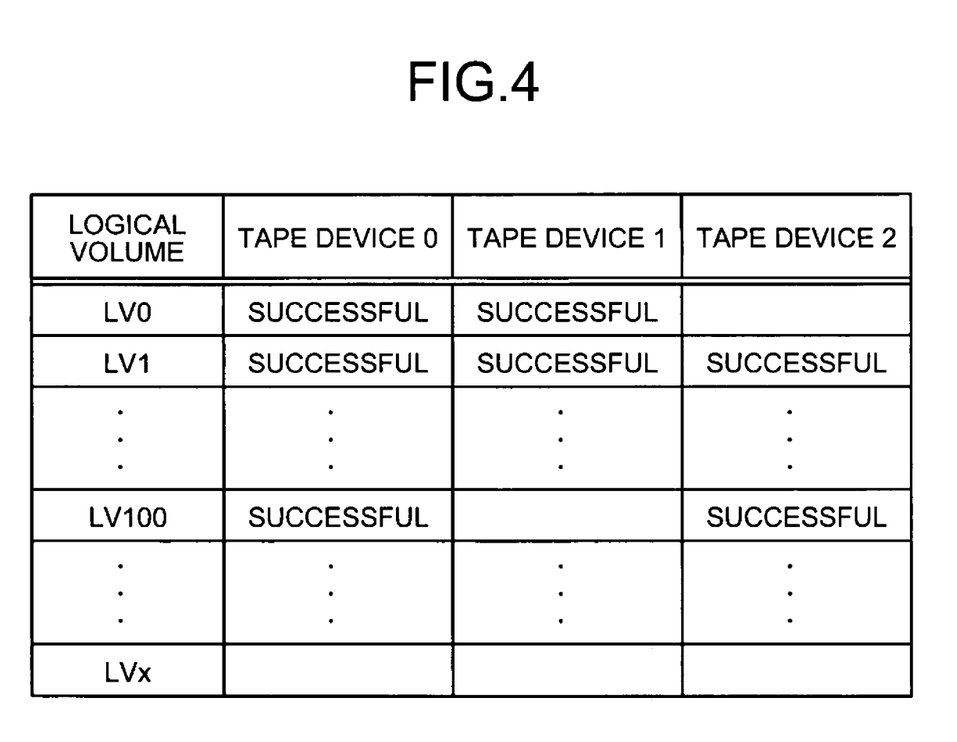
FIG. 4 is an example of contents of a duplication definition table shown in FIG. 3.

The duplication definition table 111 indicates duplication definition information that defines on which tape devices data corresponding to each of logical volumes as a unit of duplication is stored. The duplication definition information is defined by a user and stored on the duplication definition table 111 in advance. FIG. 4 is an example of the duplication definition table 111. The duplication definition table 111 includes columns of a "logical volume", a "tape device 0", a "tape device 1", and a "tape device 2".

In the column of the logical volume, identification information to identify each of the logical volumes as a unit of duplication is indicated. In the column of the tape device 0, information on whether data corresponding to each of the logical volumes is stored on the tape device 31 is indicated. In the column of the tape device 1, information on whether data corresponding to each of the logical volumes is stored on the tape device 32 is indicated. In the column of the tape device 2, information on whether data corresponding to each of the logical volumes is stored on the tape device 50 is indicated.

Specifically, in the column of the logical volume, "LV0", "LV1", "LV100", and "LVx" are indicated as a unit of duplication. In the columns of the tape devices 0, 1, and 2, "successful" is indicated if data corresponding to each of the logical volumes is stored on the tape device 31, 32, or 50. For example, data corresponding to the logical volume LV0 is stored on the tape devices 31 and 32 as the columns of the tape devices 0 and 1 are indicated by "successful". Data corresponding to the logical volume LV1 is stored on the tape devices 31, 32, and 50 as the columns of the tape devices 0, 1, and 2 are indicated by "successful". Data corresponding to the logical volume LV100 is stored on the tape devices 31 and 50 as the columns of the tape devices 0 and 2 are indicated by "successful".

Figure 5:
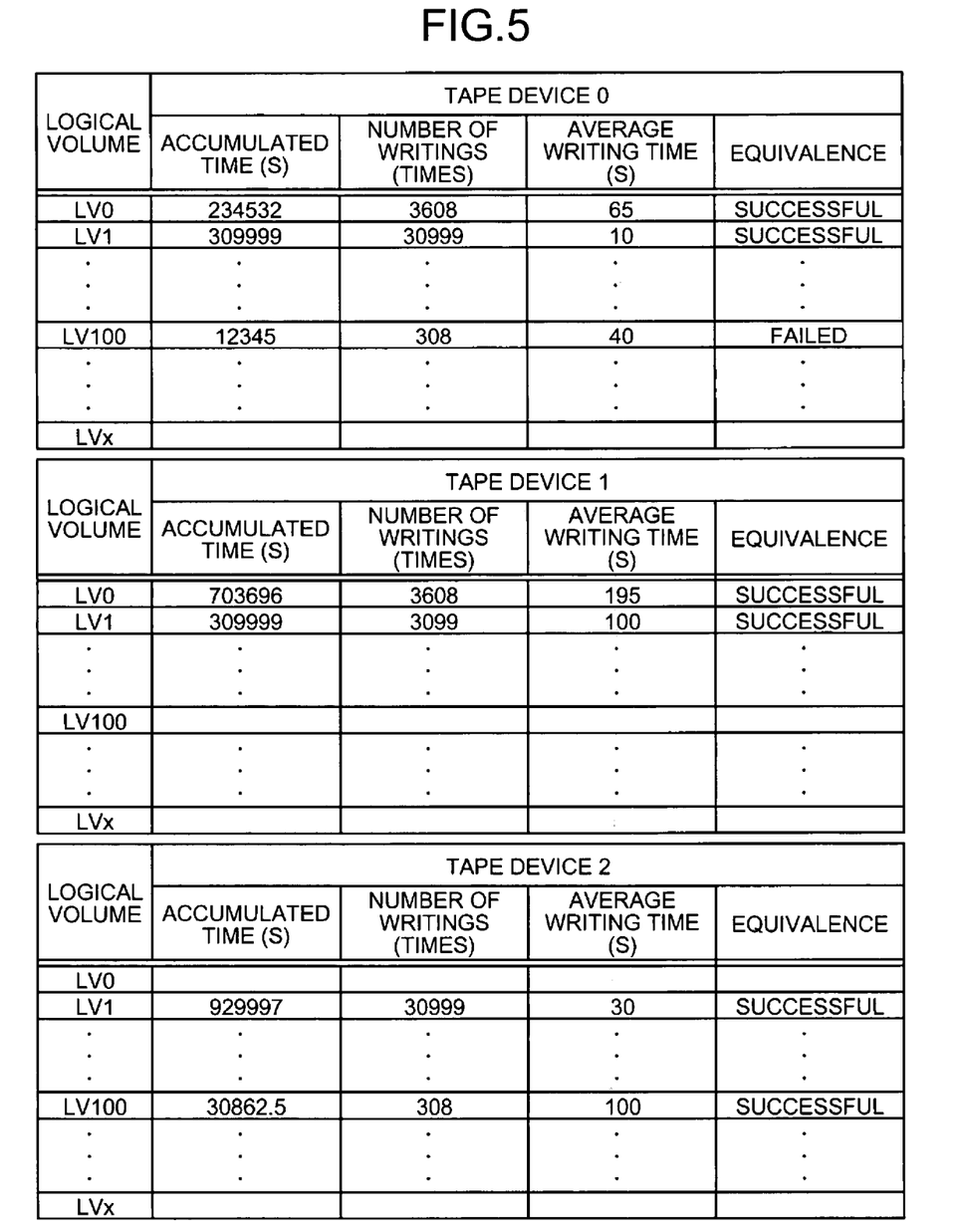
FIG. 5 is an example of contents of a duplication status table shown in FIG. 3.

The duplication status table 112 indicates duplication status information, i.e., a storing status of data corresponding to each of the logical volumes in each of the tape devices 0 to 2. FIG. 5 is an example of the duplication status table 112. The duplication status table 112 includes columns of the "logical volume" and an "accumulated time", the "number of writings", an "average writing time", and the "equivalence" in each of the tape devices 0 to 2.

In the columns of the logical volume, identification information to identify each of the logical volumes as a unit of duplication is indicated. In the columns of the accumulated time, information on an accumulated data writing time in each of the tape devices 0 to 2 is indicated. In the columns of the number of writings, information on the number of data writings in each of the tape devices 0 to 2 is indicated. In the columns of the average writing time, information on an average time for one-time data writing (that is calculated by dividing the accumulated time by the number of writings) in each of the tape devices 0 to 2 is indicated. In the columns of the equivalence, information on whether data is properly stored on each of the tape devices 0 to 2 at the time of the latest data duplication is indicated.

Specifically, in the column of the logical volume, "LV0", "LV1", "LV100", and "LVx" are indicated as a unit of duplication. For example, in the column of the accumulated time in the tape device 0, "234,532 (seconds)", "309,999 (seconds)", and "12,345 (seconds)" are indicated. In the column of the number of writings in the tape device 0, "3,608 (times)", "30,999 (times)", and "308 (times)" are indicated. In the column of the average writing time in the tape device 0, "65 (seconds)", "10 (seconds)", and "40 (seconds)" are indicated. In the column of the equivalence in the tape device 0, "successful" is indicated if data corresponding to each of the logical volumes is properly stored on the tape device 31 (see rows of the LV0 and LV1), or "failed" is indicated if data corresponding to each of the logical volumes is not properly stored on the tape device 31 (see a row of the LV100).

In the embodiment, the average writing time is calculated based on the accumulated time and the number of writings. Alternatively, it is also possible to use an accumulated data length instead of the number of writings and obtain an average writing time of a certain data length. Namely, the accumulated time is divided by the accumulated data length, thereby obtaining the average writing time.

Figure 6:
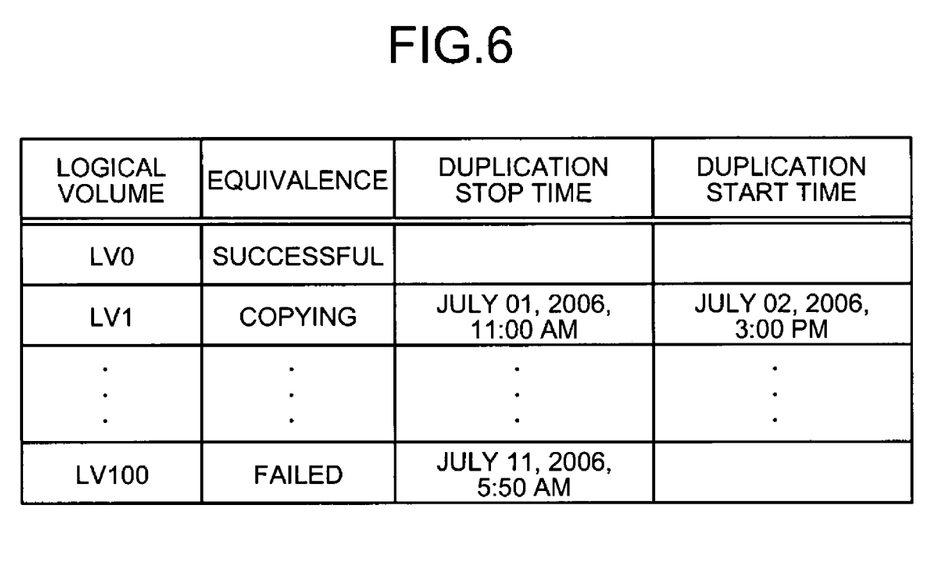
FIG. 6 is an example of contents of a duplication monitoring table shown in FIG. 3.

The duplication monitoring table 113 indicates duplication monitoring information of each of the logical volumes. FIG. 6 is an example of the duplication monitoring table 113. The duplication monitoring table 113 includes columns of the "logical volume", the "equivalence", a "duplication stop time", and a "duplication start time".

In the column of the logical volume, identification information to identify each of the logical volumes as a unit of duplication is indicated. In the column of the equivalence, information on whether data is properly stored on the tape devices, which are defined in the duplication definition table 111, at the time of the latest data duplication is indicated. In the column of the duplication stop time, a date and time when the data duplication processing is stopped, for example, because of a shortage of a disk space of the RAID device 11 are indicated. In the column of the duplication start time, a date and time when backup of data is started processing at a predetermined timing, for example, during off-peak hours of workloads are indicated.

Specifically, in the column of the logical volume, "LV0", "LV1", "LV100", and "LVx" are indicated as a unit of duplication. In the column of the equivalence, "successful" is indicated if data is properly stored on the tape devices that are defined in the duplication definition table 111 (see a row of the LV0), or "failed" is indicated if data is not properly stored on the tape devices that are defined in the duplication definition table 111 (see a row of the LV100), or "copying" is indicated when data is being backed up to the tape devices (see a row of the LV1). In the column of the duplication stop time, "Jul. 1, 2006, 11:00 AM" and "Jul. 11, 2006, 5:50 AM" are indicated. In the column of the duplication start time, "Jul. 2, 2006, 3:00 PM" is indicated.

The control unit 120 controls the entire virtual-tape-system control device 100. The control unit 120 includes a data-transfer control unit 121, a duplication processing unit 122, a tape-library control unit 123, and a duplication-instruction receiving unit 124.

The data-transfer control unit 121 controls data transfer based on an instruction from the host-interface control device 12. Specifically, upon receiving an instruction for data writing or data reading from the host device 20, the data-transfer control unit 121 writes data on or reads data from logical volumes on the disks in the RIAD device 11 or the tape devices 31, 32, and 50 based on an instruction from the host-interface control device 12, such as a mount command, a tape positioning command, a tape read/write command, a tape rewind command, a tape unload command, and a tape unmount command.

For example, upon receiving an unload command from the host-interface control device 12, the data-transfer control unit 121 stores data, which is written on a logical volume on the disk in the RIAD device 11 followed by a write command, on any of the tape devices 31, 32, and 50 that are defined in the duplication definition table 111.

Before storing the data on the tape device, the data-transfer control unit 121 checks a disk space of the RAID device 11. If the disk space is below a threshold, the data-transfer control unit 121 selects one tape device having the shortest average writing time from the tape devices that are defined as a storing location of the logical volume corresponding to the data in the duplication status table 112.

Incidentally, the data-transfer control unit 121 selects one tape device having the shortest average writing time, but the embodiment is not limited to only one tape device. The data-transfer control unit 121 can select a plurality of tape devices, for example, a certain number of tape devices in the order of those having short average writing time.

The data-transfer control unit 121 instructs the tape-library control unit 123 to store the data corresponding to the logical volume on the selected tape device. Afterwards, upon receiving a completion notice of data writing from the selected tape device, the data-transfer control unit 121 sets the data corresponding to the logical volume that is stored on the disk in the RAID device 11 as the clearing target data.

When the data-transfer control unit 121 detects that a disk space of the RAID device 11 is below a threshold, if an instruction for data writing to the other tape devices is already issued, the data-transfer control unit 121 instructs the tape-library control unit 123 to stop transferring the data to the other tape devices once the data-transfer control unit 121 receives a completion notice of data writing from any one of the tape devices.

Whenever data is stored on the tape device, the data-transfer control unit 121 updates the duplication status information in the duplication status table 112, i.e., the accumulated time, the number of writings, the average writing time (calculated based on the accumulated time and the number of writings), and the equivalence in each of the logical volumes.

If data is stored on the elected tape device, whenever data is stored on the selected tape device, the data-transfer control unit 121 further updates the duplication stop time and the duplication start time included in the duplication monitoring information in the duplication monitoring table 113 in each of the logical volumes.

The process for storing data on tape devices as described above is referred to as "data storage processing". The data storage processing will be explained later with reference to FIG. 7.

In the embodiment, the data-transfer control unit 121 performs the data storage processing when a disk space of the RAID device 11 drops below the threshold. Alternatively, the data-transfer control unit 121 detects the maximum amount of fluctuation in the data writing time in each of the tape devices based on the duplication status information in the duplication status table 112. If the maximum amount of fluctuation exceeds a threshold, the data-transfer control unit 121 can perform the data storage processing.

Moreover, the data-transfer control unit 121 can perform the data storage processing not based on the duplication status information in the duplication status table 112 but after a predetermined time passes. For example, even though the predetermined time passes after the data-transfer control unit 121 first receives a completion notice of data writing from one of the tape devices, if the data-transfer control unit 121 receives no completion notice of data writing from other tape devices, the data-transfer control unit 121 can select the tape device that sent the completion notice to the data-transfer control unit 121 first.

The duplication processing unit 122 backs up (duplicates) the data stored on the selected tape device to other tape devices on which the data has not been stored. The duplication processing unit 122 instructs the tape-library control unit 123 to back up the data stored on the selected tape device to the other tape devices at a predetermined timing, for example, during off-peak hours of workloads, or upon receiving an instruction from the duplication-instruction receiving unit 124.

Specifically, at the predetermined timing, for example, during off-peak hours of workloads, the duplication processing unit 122 checks a data storage status of each of the tape devices that are defined as a data storing location in each of the logical volumes with reference to the duplication status information in the duplication status table 112.

The duplication processing unit 122 instructs the tape-library control unit 123 to back up the data in each of the logical volumes, which is stored on the tape device (that the equivalence is indicated by "successful" in the duplication status table 112), to the other tape devices on which the data has not been stored (that the equivalence indicated by "failed" in the duplication status table 112).

Whenever data is backed up to the tape devices, the duplication processing unit 122 updates the duplication monitoring information, i.e., the equivalence and the duplication start time in the duplication monitoring table 113 in each of the logical volumes.

The process for backing up data to the tape devices as described above is referred to as "data backup processing". The data backup processing will be explained later with reference to FIG. 8.

When the duplication processing unit 122 receives an instruction from a user via the duplication-instruction receiving unit 124, the duplication processing unit 122 performs the data backup processing only on the specific logical volume that is specified by the user's instruction.

In the embodiment, the duplication processing unit 122 performs the data backup processing at the predetermined timing, for example, during off-peak hours of workloads. Alternatively, the duplication processing unit 122 can perform the data backup processing when a total amount of the clearing target data stored on the disks in the RAID device 11 exceeds a threshold.

The tape-library control unit 123 instructs the tape-device control devices 13 to 15 and the robot control device 16 to control the tape devices in the tape library 30.

The duplication-instruction receiving unit 124 displays a status of the data duplication processing on the display unit in the console terminal 60 based on an instruction from a user. The duplication-instruction receiving unit 124 also displays the logical volumes on the display unit, so that a user specifies the logical volume to be duplicated.

Specifically, upon receiving an inquiry from a user, the duplication-instruction receiving unit 124 outputs the duplication monitoring information in the duplication monitoring table 113 to the console terminal 60. The console terminal 60 displays the duplication monitoring information on the display unit. When a user specifies the logical volume to be duplicated, the duplication-instruction receiving unit 124 instructs the duplication, processing unit 122 to back up data corresponding to the logical volume that is specified by the user's instruction to other tape devices on which the data has not been stored.

Figure 7:
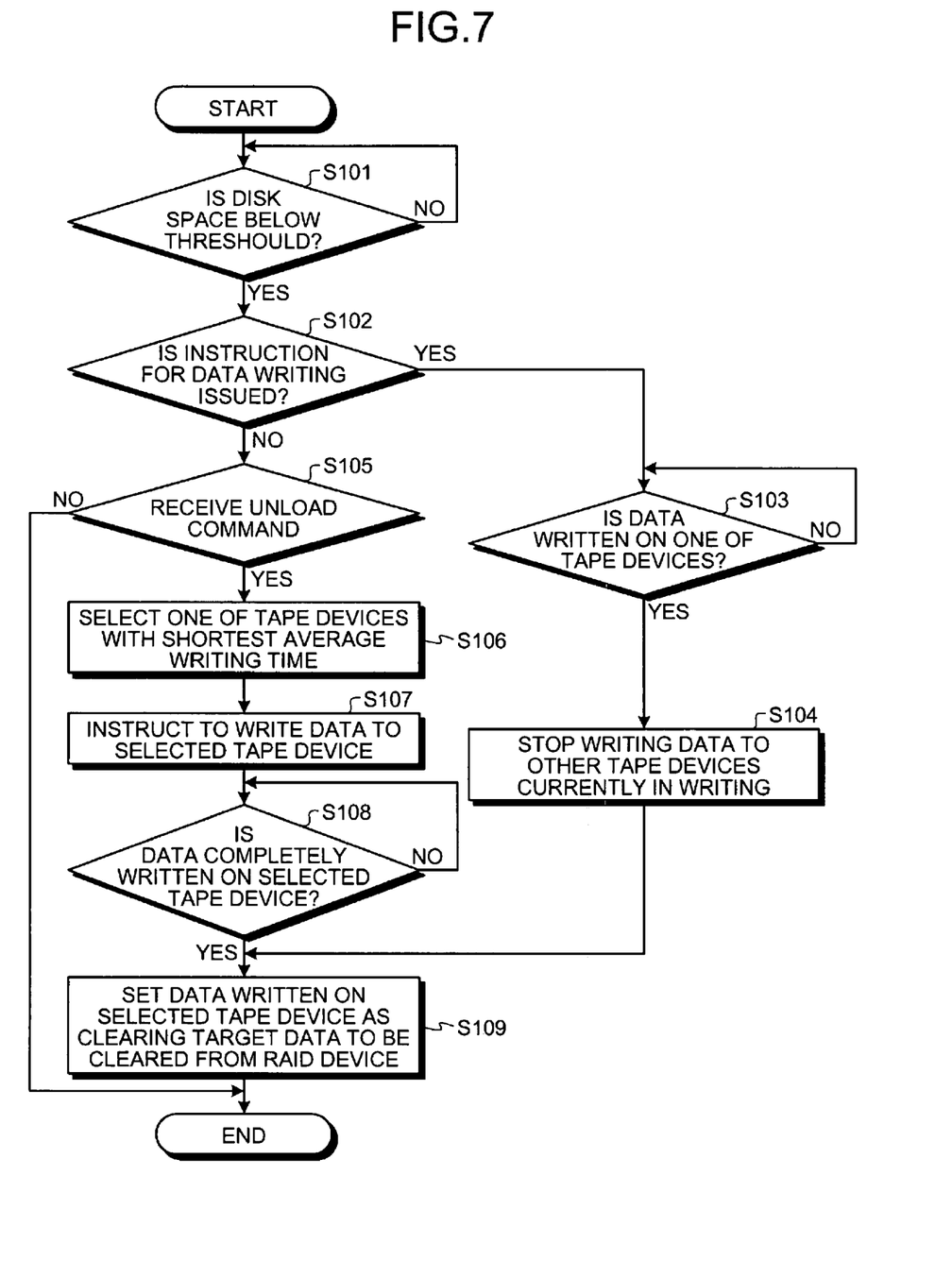
FIG. 7 is a flowchart of data storage processing.

FIG. 7 is a flowchart of the data storage processing. The data storage processing performed by the data-transfer control unit 121 is mainly described in detail below, and the description of updating the tables is omitted.

If the data-transfer control unit 121 determines that a disk space of the RAID device 11 is below the threshold (YES at step S101), the data-transfer control unit 121 further determines whether an instruction for data writing is issued to tape devices (step S102). If the instruction for data writing is issued to the tape devices (YES at step S102), the data-transfer control unit 121 further determines whether any one of the tape devices to which the instruction for data writing is issued has sent a completion notice of data writing (step S103).

If any one of the tape devices has sent the completion notice of data writing (YES at step S103), the data-transfer control unit 121 transmits a command to the robot control device 16 and the tape-device control devices 13 to 15 and stops writing data to other tape devices currently in writing (step S104).

If the instruction for data writing is not issued to the tape devices (NO at step S102), the data-transfer control unit 121 receives an unload command from the host device 20 (YES at step S105). Upon receiving the unload command from the host device 20, the data-transfer control unit 121 compares the average writing time of each of the tape devices that are defined as the storing location of the logical volume corresponding to the data, and selects one of the tape devices having the shortest average writing time with reference to the duplication status table 112 (step S106). Then, the data-transfer control unit 121 instructs the duplication processing unit 122 to write the data corresponding to the logical volume to the selected tape device (step S107).

If the data-transfer control unit 121 receives a completion notice of data writing from the selected tape device (YES at step S108), the data-transfer control unit 121 sets the data corresponding to the logical volume as the clearing target data to be cleared from the RAID device 11 (step S109).

Figure 8:
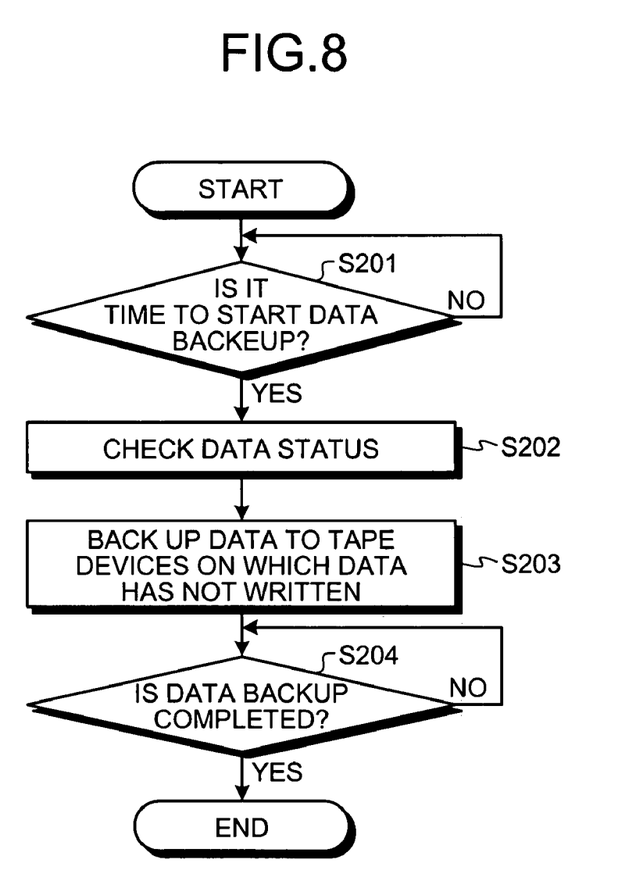
FIG. 8 is a flowchart of data backup processing.

FIG. 8 is a flowchart of the data backup processing. The data backup processing performed by the duplication processing unit 122 is mainly described below, and the description of updating the tables is omitted.

The duplication processing unit 122 performs the data backup processing at the predetermined timing, for example, during off-peak hours of workloads (YES at step S201). The duplication processing unit 122 checks a data status in each of the tape devices that are defined as the data storing location of each of the logical volumes with reference to the duplication status information in the duplication status table 112 (step S202).

The duplication processing unit 122 backs up the data stored on the tape device to other tape devices on which the data has not been stored (duplicated) in each of the logical volumes (step S203).

Once confirming that the data corresponding to all the logical volumes has been completely backed up to all the tape devices that are defined as the data storing location (YES at step S204), the duplication processing unit 122 completes the data backup processing.

As described above, according to the embodiment, the data-transfer control unit 121 stores data, which is stored on a disk in the RAID device 11, on a selected tape device. Then, the data-transfer control unit 121 sets the data as the clearing target data to be cleared from the disk in the RAID device 11. Afterwards, the duplication processing unit 122 backs up the data stored on the selected tape device to other tape devices on which the data has not been stored. Thus, it is possible to prevent the performance degradation that is caused by a shortage of a disk space of the RAID device 11 used as a cache.

According to the embodiment, the data-transfer control unit 121 stores data on the tape device having the highest data writing speed based on information about the data writing time of each of the tape devices that is stored in the duplication status table 112. Therefore, a time for holding the data on the disk in the RAID device 11 can be shortened. Thus, it is possible to prevent the performance degradation that is caused by the shortage of the disk space of the RAID device 11 efficiently.

According to the embodiment, the data-transfer control unit 121 determines whether a disk space of the RAID device 11 is below the threshold. If the disk space is below the threshold, the data-transfer control unit 121 selects any one of the tape devices and stores the data, which is stored on the disk in the RAID device 11, on the selected tape device. Therefore, only if the disk space of the RAID device 11 is insufficient, the duplication processing unit 122 can put off to back up the data to other tape devices that are not selected by the data-transfer control unit 121. Thus, a time lag of backup of the data among the tape devices can be minimized.

According to the embodiment, the data-transfer control unit 121 detects the maximum amount of fluctuation in the data writing time of each of the tape devices based on the information about the data writing time that is stored in the duplication status table 112. If the detected maximum amount of fluctuation exceeds the threshold, the data-transfer control unit 121 selects any one of the tape devices and stores the data on the selected tape device. Therefore, only if each of the tape devices has the significantly different data writing speed, the duplication processing unit 122 can put off to back up the data to other tape devices that are not selected by the data-transfer control unit 121. Thus, a time lag of backup of the data among the tape devices can be minimized.

According to the embodiment, the data-transfer control unit 121 selects one or a plurality of the tape devices based on the information about the data writing time that is stored in the duplication status table 112, and stores the data, which is stored on the disk in the RAID device 11, on the selected tape device(s), for example, that have the shortest average writing time or the highest data writing speed. Therefore, a time for holding the data on the disk in the RAID device 11 can be shortened. Thus, it is possible to prevent the performance degradation that is caused by the shortage of the disk space of the RAID device 11 efficiently.

According to the embodiment, the data-transfer control unit 121 receives a completion notice of data writing from each of the tape devices when the data has been completely written on each of the tape devices. Even though a predetermined time passes after the data-transfer control unit 121 first receives the completion notice from one of the tape devices, if the data-transfer control unit 121 receives no completion notice of data writing from other tape devices, the data-transfer control unit 121 selects the tape device that sent the completion notice first and stores the data on the selected tape device, and at the same time, stops writing the data on the other tape devices. Therefore, the data-transfer control unit 121 can select the tape device having the highest data writing speed by measuring the writing speed in real time. Thus, it is possible to determine the tape device on which data is initially stored depending on a latest status of each of the tape devices.

According to the embodiment, when a total amount of data set as the clearing target data to be cleared from the RAID device 11 exceeds a predetermined data amount, the duplication processing unit 122 backs up the data stored on the selected tape device to other tape devices. Thus, the backup processing load can be balanced.

The virtual-tape-system control device 100 according to the embodiment is described above. Functions of each of the units included in the virtual-tape-system control device 100 can be applied to software, so that a computer program for controlling data storage is obtained. A computer for implementing the computer program for controlling data storage is described below.

Figure 9:
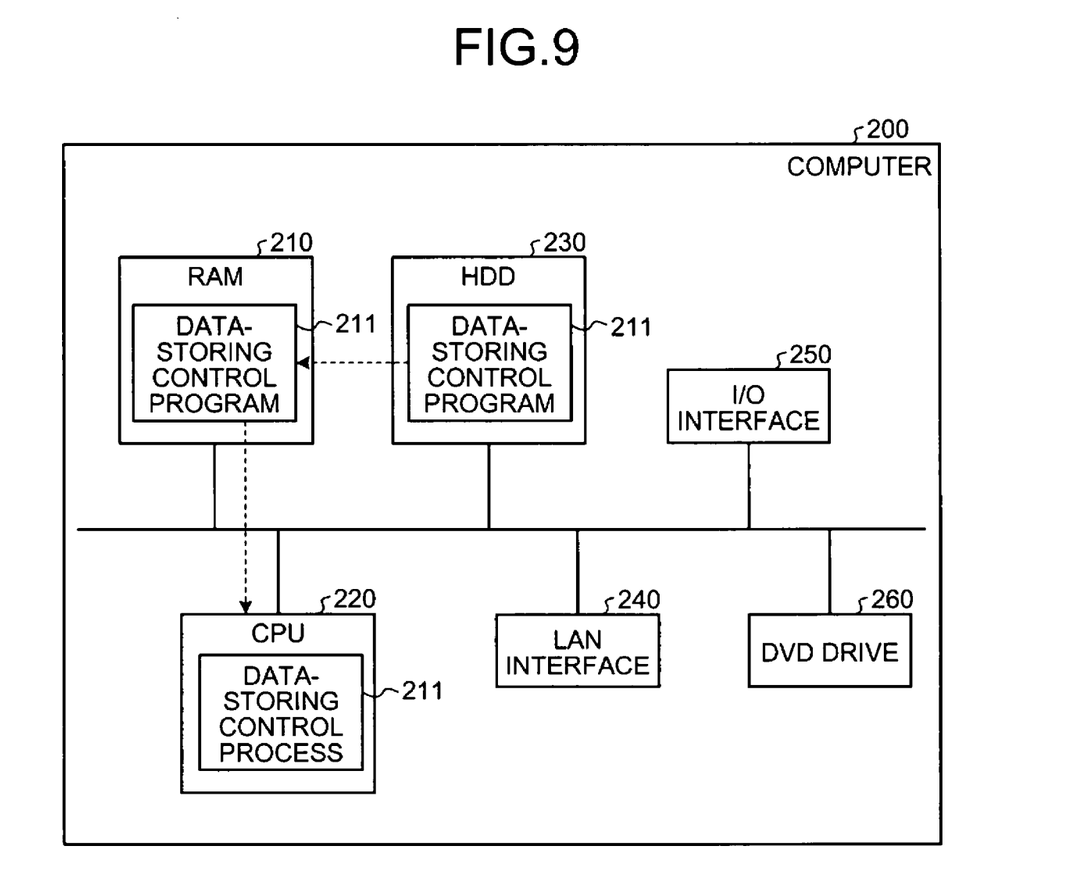
FIG. 9 is a block diagram of a computer that realizes the method according to the embodiments.

FIG. 9 is a block diagram of a computer 200 for implementing the computer program for controlling data storage according to the embodiment. The computer 200 includes a random access memory (RAM) 210, a central processing unit (CPU) 220, a hard disk drive (HDD) 230, a local area network (LAN) interface 240, an input/output (I/O) interface 250, and a digital versatile disk (DVD) drive 260.

The RAM 210 stores therein the computer program and an execution result of the computer program. The CPU 220 retrieves the computer program from the RAM 210, and executes the computer program.

The HDD 230 is a disk device that stores therein the computer program or data. The computer 200 is connected to other computer via the LAN interface 240.

The I/O interface 250 is connected to an input unit, such as a mouse or a keyboard, and a display unit. The DVD drive 260 performs reading/writing a DVD.

The DVD stores therein a data-storing control program 211 that is executed by the computer 200. The DVD is read by the DVD drive 260, and installed on the computer 200.

Alternatively, the data-storing control program 211 can be stored on a database in other computer system that is connected to the computer 200 via the LAN interface 240. The data-storing control program 211 is retrieved from the database and installed on the computer 200.

The data-storing control program 211 installed on the computer 200, and stored on the HDD 230. The RAM 210 retrieves the data-storing control program 211 from the HDD 230. The data-storing control program 211 is executed by the CPU 220 as a data-storing control process 221.

Automatically-performed processes can be fully or partially performed manually. To the contrary, manually-performed processes can be fully or partially performed automatically in any well-known manner.

Processing procedures, control procedures, tangible names, any information about data and parameters those described in the embodiment and the accompanying drawings can be changed except as otherwise be specified.

The accompanying drawings depict each element in each of the devices conceptually. Therefore, each element is no need to be physically located as shown in the accompanying drawings. Namely, a physical configuration of the devices is not limited to the same for as shown in the accompanying drawings. The devices can be fully or partially dispersed or integrated functionally or physically on any unit basis depending on a load or a usage status.

Functions to be processed by the devices can be fully or partially activated by the CPU 220 and the computer program that is analyzed and executed by the CPU 220, or functioned as hardware by the wired logic.

According to an aspect of the present invention, it is possible to prevent performance degradation that is caused by a shortage of a disk space of the first storage device used as a cache.

According to still another aspect of the present invention, it is possible to put off to back up the data to the third storage device. Thus, a time lag of backup of the data between the second and third storage devices can be minimized.

According to still another aspect of the present invention, it is possible to put off to back up the data to the third storage device. Thus, a time lag of backup of the data between the second and third storage devices can be minimized.

According to still another aspect of the present invention, a time for holding the data on the first storage device can be shortened. Thus, it is possible to prevent the performance degradation that is caused by the shortage of the disk space of the first storage device efficiently.

According to still another aspect of the present invention, the second storage device can be selected by measuring the writing speed in real time. Thus, it is possible to determine the second storage device on which the data is initially stored depending on a latest status of each of the storage devices.

According to still another aspect of the present invention, if a total amount of data set as the clearing target data exceeds a predetermined data amount, the data stored in the second storage device is backed up to the third storage device. Thus, the backup processing load can be balanced.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for duplicating data stored in a first storage device on a plurality of storage devices, the apparatus comprising:
    a selecting unit that selects a second storage device whose writing rate is highest from among the plurality of storage devices, the writing rate being calculated by dividing length of data accumulated in the second storage device with time for writing the accumulated data;
    a data storing unit that stores the data stored in the first storage device on the second storage device selected by the selecting unit;
    a data setting unit that sets, upon the data storing unit completes storing of the data in the second storage device selected, the data stored in the first storage device as clearing target data to be cleared from the first storage device; and
    a data backup unit that backs up the data stored in the second storage device selected to one of the plurality of storage devices upon the data setting unit setting completes setting of the clearing target data.

2. The apparatus according to claim 1, further comprising a time storing unit that stores therein information about a data writing time of each of the storage devices, wherein
    plural candidate storage devices are provided as a candidate for the second storage device, and
    the data storage unit selects one storage device having a shortest writing time from the candidate storage devices as the second storage device based on the information about the data writing time stored in the time storing unit.

3. The apparatus according to claim 1, wherein
    the data storing unit determines whether a disk space of the first storage device is below a threshold, and
    if it is determined that the disk space is below the threshold, the data storing unit stores the data stored in the first storage device in the second storage device.

4. The apparatus according to claim 3, wherein
when the data stored in the first storage device is stored in the second storage device, if the data storing unit already starts writing the data to a plurality of storage devices, the data storing unit determines one of the plurality of storage devices, which has finished writing the data first, as the second storage device, and stops writing the data to other storage devices that have not finished writing the data.

5. The apparatus according to claim 1, further comprising a time storing unit that stores therein information about a data writing time of each of the storage devices, wherein
the data storing unit detects a maximum amount of fluctuation in the data writing time of each of the storage devices based on the information about the data writing time stored in the time storing unit and stores the data in the second storage device if the maximum amount of fluctuation exceeds a threshold.

6. The apparatus according to claim 5, wherein the data storing unit selects one or a plurality of storage devices as the second storage device based on the information about the data writing time stored in the time storing unit and stores the data stored in the first storage device in selected second storage devices.

7. The apparatus according to claim 1, further comprising a notice receiving unit that receives a completion notice from each of storage devices when storing of the data is completed in each of the storage devices, wherein
even though a predetermined time passes after the notice receiving unit first receives the completion notice from any one of the storage devices, if the notice receiving unit receives no completion notice from other storage devices, the data storing unit selects the storage device that sent the completion notice first as the second storage device and stops writing the data on the other storage devices.

8. The apparatus according to claim 1, wherein the data backup unit backs up the data that is stored in the second storage device by the data storing unit to one of the plurality of storage devices if a total amount of the clearing target data that is set by the data setting unit exceeds a predetermined data amount.

9. A method for duplicating data stored in a first storage device on a plurality of storage devices, the method comprising:
selecting a second storage device whose writing rate is highest from among the plurality of storage devices, the writing rate being calculated by dividing length of data accumulated in the second storage device with time for writing the accumulated data;
storing the data stored in the first storage device on the second storage device selected by the selecting;
setting, upon completion of the storing of the data in the second storage device selected, the data stored in the first storage device as clearing target data to be cleared from the first storage device; and
backing up the data stored in the second storage device selected to one of the plurality of storage devices upon completion of the setting.

10. A system for controlling data comprising a first storage device and an apparatus for duplicating data stored in the first storage device on a plurality of storage devices, wherein the system includes
a selecting unit that selects a second storage device whose writing rate is highest from among the plurality of storage devices, the writing rate being calculated by dividing length of data accumulated in the second storage device with time for writing the accumulated data;
a data storing unit that stores the data stored in the first storage device on the second storage device selected by the selecting unit;
a data setting unit that sets, upon the data storing unit completes storing of the data in the second storage device selected, the data stored in the first storage device as clearing target data to be cleared from the first storage device; and
a data backup unit that backs up the data stored in the second storage device selected to one of the plurality of storage devices upon the data setting unit setting completes setting of the clearing target data.

* * * * *